No. 889,349. PATENTED JUNE 2, 1908.
J. WILSON.
GREENHOUSE BENCH.
APPLICATION FILED JULY 19, 1907.
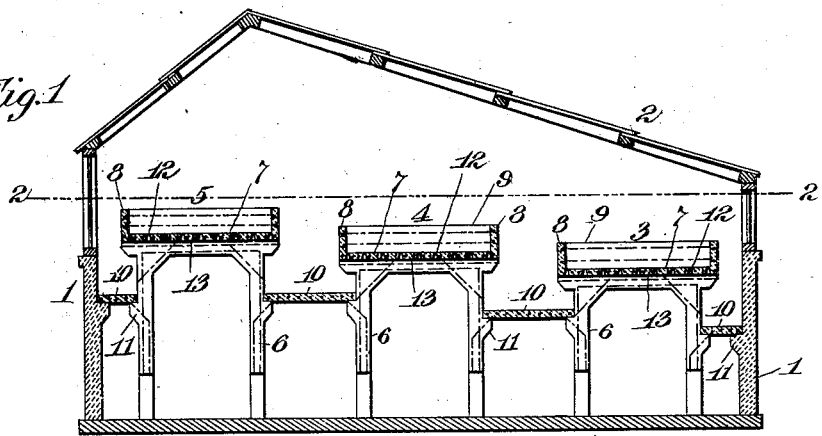
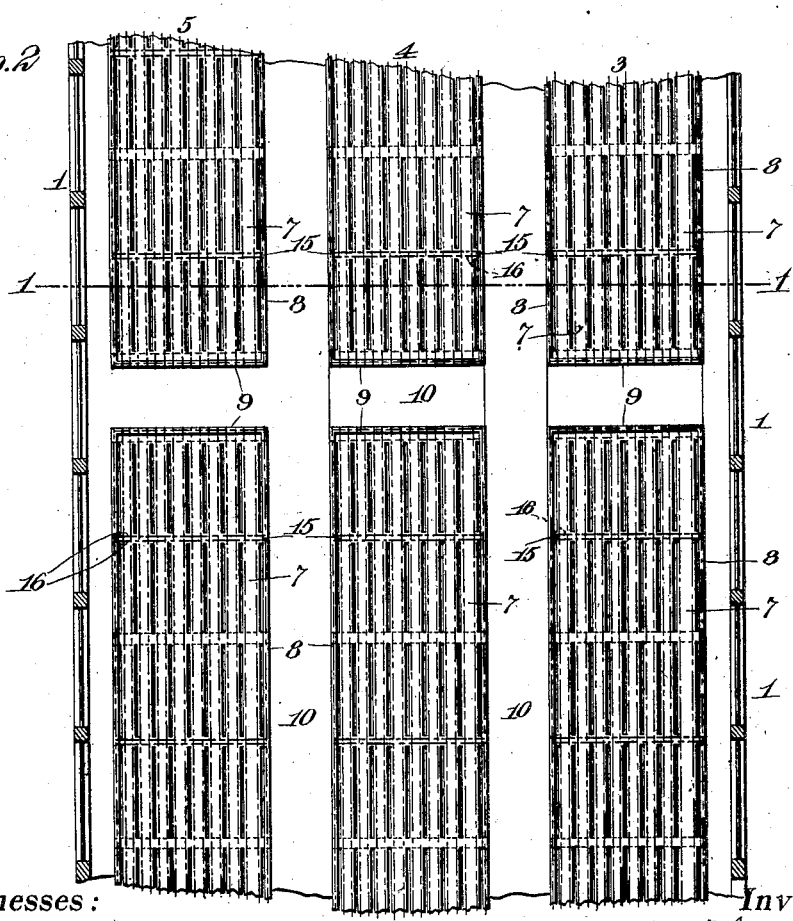
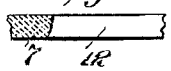

UNITED STATES PATENT OFFICE.

JOHN WILSON, OF SHORT HILLS, NEW JERSEY, ASSIGNOR, BY DIRECT AND MESNE ASSIGNMENTS, TO WILSON-HOYT COMPANY, OF SHORT HILLS, NEW JERSEY, A CORPORATION OF NEW JERSEY.

GREENHOUSE-BENCH.

No. 889,349.  Specification of Letters Patent.  Patented June 2, 1908.

Application filed July 19, 1907. Serial No. 384,636.

*To all whom it may concern:*

Be it known that I, JOHN WILSON, a citizen of the United States, and a resident of Short Hills, county of Essex, and State of New Jersey, have invented a Greenhouse-Bench, of which the following is a specification.

The object I have in view is the production of a greenhouse which will be cheaper, stronger and more durable than those heretofore made. I construct my greenhouse, the benches and preferably the platforms, of monolithic construction of reinforced concrete, without any exposed iron, so that rust will be prevented.

By my construction I make a bench for my greenhouse, having a level surface, which is advantageous in removing and otherwise manipulating the soil.

The improved bench is so designed that it can be made of different sizes, with one size of building apparatus, whereby cheapness is secured, as the amount of apparatus is reduced to the minimum, and the expense of transportation is likewise reduced.

By my invention I make the benches of the greenhouse upon the premises in which they are to be used, varying them in size and length to suit each particular job.

Other advantages of my invention will more fully appear from the following specification and the drawings forming a part of this specification, either taken together or separately.

In the drawing, Figure 1 is a cross-section on the line 1—1 of Fig. 2 of a greenhouse embodying my invention. Fig. 2 is a horizontal section of the same on the line 2—2 of Fig. 1. Fig. 3 is an enlarged cross-section of the top of the bench, showing the form of the slots, and Fig. 4 is a sectional view through one of the slots, taken at right angles to Fig. 3.

In all of the views like parts are designated by the same reference characters.

In Figs. 1 and 2 a greenhouse is shown comprising sides 1—1 and a roof 2; the former are preferably made of reinforced concrete, although this is not essential. The latter may be of the usual glass construction.
Within the house are the benches 3, 4 and 5, which extend, with or without interruption throughout the length of the greenhouse. The benches are shown as of gradually increasing height from one side of the house to the other, a desirable construction permitting the back and higher benches to receive the proper proportion of light and heat. The benches are shown as formed integral with the bents 6, which are preferably of reinforced concrete, and have longitudinally slotted tops 7, vertical sides 8 and ends 9. The sides and ends may be omitted in certain situations if considered desirable. Between the sides and ends of the benches and between the benches and the walls of the house are raised platforms 10, which are preferably of monolithic reinforced concrete. These platforms rest upon projections or brackets 11 formed upon the sides of the bents and the inner walls of the house. The heights of the platforms vary so that they will be at a convenient distance from the top of each of the benches.

The longitudinal slots 12 in the tops of the benches divide them into longitudinal slabs or slats 13. These slats are reinforced by longitudinal wires or other metallic members 14, which extend from end to end of each bench.

The benches are made of any length desired and may in practice exceed several hundred feet. The bents are arranged at convenient intervals, preferably a distance apart slightly greater than the width of the bench. Between each pair of bents the slots 12 are preferably interrupted one or more times in order to form transverse slats 15. These transverse slats are preferably reinforced by wires or other metallic members 16. These reinforcing wires are preferably under tension during the molding operation, so that they will lie in substantially the same horizontal plane throughout the length of the bench. The sides 8 and ends 9 are preferably reinforced by wires similar to the wires 14, and the transverse wires 16 preferably extend upward into the sides. The entire bench is therefore formed of monolithic reinforced concrete, the top being smooth and provided with longitudinal slots, which permit the escape of the moisture from the soil. The tops, sides and ends of the benches are reinforced. By this construction the sides, ends and tops can be made of a minimum thickness with a resulting economy in manufacture.

The slots 12 are best made parallel so that by such construction they may be more readily manufactured. The platforms 10 may extend across the ends of the benches, uniting the several rows of benches, preferably where separate rows are employed, as shown in Fig. 2.

The benches are preferably made from bents of certain stock sizes which are arranged at proper intervals, and the tops with the sides and ends where the latter are used are molded in place upon the bents, and within the greenhouse or other place where they are to be used.

The greenhouse may be provided with any suitable flooring; or the said house may be made without any flooring, if desired, and the space beneath the benches or beneath the platforms 10 may be used for the usual or any desired purpose, such as a water-reservoir, furnace, etc.

It is to be noted that the sides and ends of the slots 12 taper, as shown in Figs. 3 and 4, the slots being wider at the bottom than the top. This prevents clogging, as pebbles and other obstructions entering the slots cannot become wedged downward by the pressure of the soil above the slots. It will be observed that the slots are unencumbered by reinforcing, so that the slot may be readily cleaned by means of a narrow tool.

It will be understood that the greenhouse may be of any desired shape and dimensions, and the superstructure thereof may be formed in the usual or any preferred manner, my invention being limited to the construction of the benches or tables by which the plants are supported.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having fully described my invention, what I claim as new, and desire to secure by Letters Patent, is:

1. A greenhouse provided with a plurality of benches comprising tables having suitable supports and provided with bottoms having parallel slots or openings therein and having surrounding retaining-walls, said benches being separated longitudinally and transversely by raised platforms or walks arranged below said benches, all of said parts being composed of reinforced concrete and being of monolithic construction.

2. A greenhouse provided with longitudinally-arranged benches comprising retaining-tables provided with bottoms having slots or openings therein and also provided with surrounding retaining-walls, said benches being increased in height from one side of the greenhouse to the other and being separated longitudinally and transversely by platforms or walks arranged below said tables, all of said parts being composed of reinforced concrete.

3. A greenhouse provided with longitudinally-arranged benches having suitable supports and provided with bottoms having slots or openings therein and surrounding retaining-walls, said benches being separated longitudinally and transversely by platforms or walks arranged below the top thereof, and said benches being also increased in height from one side of the greenhouse to the other, all of said parts being composed of reinforced concrete.

4. A bench for a greenhouse having suitable supports, the top having parallel slots therein, the said slots extending from one support to another, with longitudinal wires extending between the slots, all of the parts being composed of reinforced concrete and of monolithic construction.

5. A bench for a greenhouse, having suitable supports, the top having parallel slots therein, the said slots extending with interruption from one support to another, with longitudinal wires extending between the slots and transverse wires extending between the ends of the slots, intermediate the supports, all of the parts being composed of reinforced concrete and of monolithic construction.

6. A bench for a greenhouse, having suitable supports, the top having parallel slots therein, the said slots having tapering walls, and being wider at the bottom than the top, and extending from one support to another, with longitudinal wires extending between the slots, all of the parts being composed of reinforced concrete and of monolithic construction.

7. A bench for a greenhouse having suitable supports, the top having a longitudinal slot therein, the said slot extending from one support to another, with a longitudinal wire extending on each side of the slot, all the parts being composed of reinforced concrete and of monolithic construction.

8. A bench for a greenhouse, having suitable supports, the top having a longitudinal slot therein, the said slot extending with interruptions from one support to another, with a longitudinal wire extending on each side of the slot and a transverse wire extending between the ends of the slot intermediate the support, all the parts being composed of reinforced concrete and of monolithic construction.

9. A bench for a greenhouse, having suitable supports, the top having a longitudinal slot therein, the said slot having tapering walls, and being wider at the bottom than at the top, and extending from one support to another, with a longitudinal wire extending on each side of the slot, all of the parts being composed of concrete and of monolithic construction.

This specification signed and witnessed this sixteenth day of July, 1907

JOHN WILSON.

Witnesses:
ETTA MAE DENISON,
LEONARD H. DYER.